(12) United States Patent
Schindler et al.

(10) Patent No.: US 12,516,447 B2
(45) Date of Patent: Jan. 6, 2026

(54) TEXTURING DEVICE AND TEXTURING METHOD

(71) Applicant: STC Spinnzwirn GmbH, Chemnitz (DE)

(72) Inventors: Kenneth Schindler, Chemnitz (DE); Klaus Peter Kluge, Koenigswalde (DE)

(73) Assignee: STC Spinnzwim GmbH, Chemnitz (DE)

( * ) Notice: Subject to any disclaimer, the term of this patent is extended or adjusted under 35 U.S.C. 154(b) by 89 days.

(21) Appl. No.: 18/700,362

(22) PCT Filed: Jul. 5, 2023

(86) PCT No.: PCT/IB2023/056954
§ 371 (c)(1),
(2) Date: Apr. 11, 2024

(87) PCT Pub. No.: WO2024/042384
PCT Pub. Date: Feb. 29, 2024

(65) Prior Publication Data
US 2025/0003115 A1 Jan. 2, 2025

(30) Foreign Application Priority Data

Aug. 26, 2022 (DE) ...................... 10 2022 121 694.2

(51) Int. Cl.
*D02G 1/12* (2006.01)
*D01D 5/22* (2006.01)
(Continued)

(52) U.S. Cl.
CPC ............... *D01D 5/22* (2013.01); *D02G 1/122* (2013.01); *D02G 1/161* (2013.01); *D02G 1/165* (2013.01);
(Continued)

(58) Field of Classification Search
CPC ............ D01D 5/22; D02G 1/12; D02G 1/122; D02G 1/16; D02G 1/161; D02G 1/165; D02G 1/20
(Continued)

(56) References Cited

U.S. PATENT DOCUMENTS 3,982,310 A    9/1976   Beck et al.
4,148,179 A    4/1979   Becker et al.
(Continued)

FOREIGN PATENT DOCUMENTS

DE    2457825 A1    6/1975
DE    2753618 A1    6/1978
(Continued)

*Primary Examiner* — Leo B Tentoni
(74) *Attorney, Agent, or Firm* — Laurence A. Greenberg; Werner H. Stemer; Ralph E. Locher

(57) ABSTRACT

A texturing device for producing crimped plastic filaments has a texturing nozzle with a hot compressed air supply port and a filament guide slot tube. A cooling mechanism in the form of a counter air flow mechanism is integrated in the texturing nozzle. A crimped plastic filament is formed by blowing a plastic filament through a nozzle insert in a conveying direction by hot compressed air and crimping in a filament guide slot tube. Then the crimped plastic filament is cooled by a counter air flow, which is cooler than the hot compressed air flow and which is directed onto the crimped plastic filament. A counter air flow slot tube is arranged between a cooling air supply port of the counter air flow mechanism and the filament guide slot tube. A pass-through nozzle is arranged between the counter air flow slot tube and the cooling air supply port.

4 Claims, 1 Drawing Sheet

(51) Int. Cl.
*D02G 1/16* (2006.01)
*D02G 1/20* (2006.01)

(52) U.S. Cl.
CPC .. *D10B 2321/021* (2013.01); *D10B 2321/022* (2013.01)

(58) Field of Classification Search
USPC ..... 264/168, 555; 425/326.1, 387.1; 28/221, 28/262, 263, 265, 266, 267, 271, 273, 28/274
See application file for complete search history.

(56) References Cited

U.S. PATENT DOCUMENTS

| | | | |
|---|---|---|---|
| 4,268,940 A | | 5/1981 | Kuroda et al. |
| 4,782,566 A | * | 11/1988 | Nabulon ................ D02G 1/122 28/255 |
| 9,790,623 B2 | | 10/2017 | Brenk et al. |
| 2015/0152577 A1 | * | 6/2015 | Brenk ..................... D02G 1/12 19/66 R |

FOREIGN PATENT DOCUMENTS

| | | |
|---|---|---|
| DE | 2903508 A1 | 11/1979 |
| DE | 102007022112 A1 | 11/2007 |
| DE | 102013020471 A1 | 6/2015 |

* cited by examiner

TEXTURING DEVICE AND TEXTURING METHOD

FIELD AND BACKGROUND OF THE INVENTION

The present invention relates to a texturing device for producing crimped plastic filaments, which comprises a texturing nozzle with a nozzle insert with a hot compressed air supply port and a filament guide slot tube and a cooling mechanism, wherein the cooling mechanism is a counter air flow mechanism integrated into the texturing nozzle. The invention further relates to a texturing method for producing crimped plastic filaments, wherein at least one plastic filament in a texturing nozzle is blown through a nozzle insert in a conveying direction by means of a hot compressed air flow and is crimped in a filament guide slot tube adjoining the nozzle insert, after which the at least one crimped plastic filament is cooled, wherein the at least one crimped plastic filament is cooled in that a counter air flow, which is at least partially directed counter to the hot compressed air flow and which is cooler than the hot compressed air flow, is directed onto the at least one crimped plastic filament.

The crimping of plastic filaments or threads described in the present invention is often also referred to as texturing of plastic filaments or threads in textile technology.

Crimped plastic filaments or crimped plastic threads are used, for example, in the production of artificial grass, where, in the case of various artificial grass types, crimped plastic threads, known as mossy fibers, are incorporated as filler material into a base region between the long, erect blades of grass formed from smooth plastic threads. This results in a particularly soft and tight structure, wherein the long blades of grass are supported by means of the crimped threads.

Document DE 24 57 825 A1 discloses a crimping device with a cylindrical stuffing chamber. The crimping device is provided with an inlet for a hot medium and four narrow lines. The four lines are arranged in such a way that turbulence of the hot medium takes place in the diffuser chamber. The stuffing chamber has a hemispherical inlet end and is provided with openings extending in the radial direction in order to enable the escape of the medium.

A device known from the document DE 29 03 508 A1 for crimping a yarn thread consists of a nozzle unit for a hot medium, a stuffing chamber with outlet openings for the hot medium, a dwell time control chamber with means for the outlet of a cold medium, and a mixing nozzle. The nozzle unit is attached to a stuffing chamber housing, which consists of an arrangement of radially-running ribs. The hot medium can flow radially out through spaces between adjacent ribs.

A similar crimping device is described in the document DE 27 53 618 A1. There, a yarn passes through an inlet opening, behind which a treatment nozzle with a central passage and four channels arranged tangentially thereto is located. The yarn is swirled with a fluid and conveyed along the passage into an relaxation chamber, which is provided with holes through which the fluid is released to the atmosphere. The device has a second nozzle in order to supply a fluid for the inhibition and cooling of the yarn.

Document DE 10 2007 022 112 A1 discloses a device for crimping synthetic threads. The device has a texturing nozzle, in which filaments of a filament bundle are entrained under the effect of hot air guided through the texturing nozzle. Due to the heat, the filaments form loops and arcs, from which a thread plug forms in a stuffing chamber of the texturing nozzle. Filaments which are also heated and thus deformed in the shape of loops are compressed at the thread plug, whereby a crimping of the filaments results.

In a further development of the known texturing nozzle, instead of the stuffing chamber, a filament guide slot tube is provided, through which the hot filaments are guided. The hot compressed air, with which the filaments are blown through the texturing nozzle, is discharged abruptly outwards through the filament guide slot tube. Due to its nature, the filament guide slot tube nevertheless holds the filament bundle together. In the region of the filament guide slot tube, a flow break arises, in which the monofilaments suddenly relax and crimp.

In both of the known texturing devices described above, a cooling drum with a gas-permeable guide sleeve is arranged under the texturing nozzle respectively, in which drum a negative pressure is generated. As a result of the air that continues to flow out of the texturing nozzle and the suction effect of the cooling drum created by the negative pressure, the crimped filaments coming out of the texturing nozzle are placed with several loops on tracks which are formed on the guide sleeve of the cooling drum. Since the rotational speed of the cooling drum is lower than the feed speed of the threads coming out of the texturing nozzle, the filaments retain their crimp, which is fixed by the cooling.

In the conventional texturing devices, the rotating cooling drum with the vacuum chamber located therein ensures accumulation, cooling, and a point-precise removal of the textured monofilaments.

The crimped filaments are then drawn off into a crimped thread by means of a draw-off means, such as a draw-off godet, downstream of the cooling drum.

At the end of the process, the crimped thread is wound onto a winding head.

Before such a crimped thread is used for artificial grass production, for example, it is in practice often thermally treated again, whereby the crimp is reinforced even more, and the thread is shortened.

The high energy consumption resulting, in particular, from the cooling drum is problematic in the known production of crimped filaments. For its operation, the cooling drum requires a vacuum, which has to be generated by a compressor. Furthermore, the drum and the compressor require a relatively large amount of space.

SUMMARY OF THE INVENTION

It is therefore the object of the present invention to provide a texturing device and a texturing method for producing crimped plastic filaments with which energy and installation space can be saved.

The object is solved on the one hand by a texturing device for producing crimped plastic filaments, which comprises a texturing nozzle with a nozzle insert with a hot compressed air supply port and a filament guide slot tube and a cooling mechanism, wherein the cooling mechanism is a counter air flow mechanism integrated into the texturing nozzle, wherein the counter air flow mechanism comprises a cooling air supply port, wherein a counter air flow slot tube oriented in line with the filament guide slot tube is arranged between the cooling air supply port and the filament guide slot tube, and wherein an pass-through nozzle is arranged between the counter air flow slot tube and the cooling air supply port.

The device according to the invention does not require a cooling drum. Instead, the device according to the invention has the counter air flow mechanism integrated into the texturing nozzle as a cooling mechanism. In the present invention, in comparison with the prior art, installation space and energy are saved by the absence of a cooling drum.

In the nozzle insert of the texturing nozzle that is closed circumferentially except for the hot compressed air supply port, at least one plastic filament is heated so strongly by the hot air flow generated by means of the hot compressed air supply port in the texturing nozzle that the at least one plastic filament forms loops. In parallel thereto, the at least one hot plastic filament is conveyed by means of the hot compressed air in the direction of the filament guide slot tube.

In the filament guide slot tube adjoining the nozzle insert, the at least one plastic filament which is strongly heated by the hot compressed air, as described above, is crimped by the abrupt flow break.

The filament guide slot tube preferably has longitudinal slots through which the hot air entering the filament guide slot tube from the nozzle insert can escape along a conveying direction of the texturing nozzle.

At the same time, the at least one crimped plastic filament is transported by the air flow of the hot compressed air in the direction of a counter air flow generated by means of the counter air flow mechanism. In the present invention, the at least one crimped plastic filament is cooled inside the texturing nozzle by the counter air flow directed against the hot compressed air flow, whereby the crimp is fixed.

Furthermore, the counter air flow brings about a slight braking and thus compression of the at least one crimped plastic filament at the point where the counter air flow meets the hot compressed air flow, as a result of which the crimp is further reinforced.

In the device according to the invention, the counter air flow mechanism comprises a cooling air supply port, wherein a counter air flow slot tube oriented in line with the filament guide slot tube and coupled thereto is arranged between the cooling air supply port and the filament guide slot tube.

According to the invention, after its exit from the filament guide slot tube, the at least one crimped plastic filament enters the counter air flow slot tube, in which the at least one crimped plastic filament meets the counter air flow in a bundle. The counter air flow brakes the at least one crimped plastic filament, which increases its compression and crimp even further, and simultaneously leads to its cooling. Due to the cooling, a solidification of the crimp takes place.

Since the counter air flow slot tube is slotted, and preferably longitudinally slotted, the counter air flow partially escapes therefrom. The counter air flow consists of air that is colder than the hot compressed air. Since the hot compressed air that has not escaped from the filament guide slot tube and that is already slightly cooled but still warm is blown counter to the counter air flow, the counter air flow is the least cold at the beginning of the counter air flow slot tube, i.e., near the filament guide slot tube, and becomes cooler and cooler in the course of the counter air flow slot tube up to the cooling air supply port. This leads to gradual solidification of the crimp of the at least one crimped plastic filament in the counter air flow slot tube.

It is particularly favorable if at least one heated godet pair, with which the at least one plastic filament can be preheated, is arranged in a filament processing direction of the texturing device before the texturing nozzle. It has been shown that, in the present invention, a single such heated godet pair is already sufficient to achieve an advantageous preheating of the at least one plastic filament. Further installation space can thereby be saved upon.

The object is also achieved by a texturing method for producing crimped plastic filaments, wherein at least one plastic filament is blown through a nozzle insert in a texturing nozzle in a conveying direction by means of a hot compressed air flow and is crimped in a filament guide slot tube adjoining the nozzle insert, after which the at least one crimped plastic filament is cooled, wherein the at least one crimped plastic filament is cooled in that a counter air flow, which is at least partially directed counter to the hot compressed air flow and is cooler than the hot compressed air flow, is directed towards the at least one crimped plastic filament, wherein the counter air flow is directed onto the at least one crimped plastic filament by means of a counter air flow slot tube oriented in line with the filament guide slot tube and coupled thereto, and wherein the at least one crimped plastic filament is pulled through the counter air flow slot tube by an pass-through nozzle that is downstream of the counter air flow tube slot in the conveying direction and blows air in the conveying direction.

In the method according to the invention, a cooling drum for cooling the at least one plastic filament crimped in the texturing nozzle is dispensed with. The method according to the invention can thus be carried out on a texturing device that consumes little energy and furthermore requires little space. The high maintenance effort due to the cooling drum used in the previous methods is also not necessary in the method according to the invention.

In the method according to the invention, not only the crimping of the at least one plastic filament, but also its cooling, and thus also a fixation of the crimp, takes place in the texturing nozzle.

In the method according to the invention, the at least one plastic filament is first heated in the preferably tubular nozzle insert, which is longitudinally closed except for a hot compressed air supply port, by the hot compressed air flow flowing into it. In the preferably longitudinally-slotted filament guide slot tube of the texturing nozzle, the at least one plastic filament is crimped by the sudden flow break.

The at least one crimped plastic filament then meets the counter air flow, which is directed opposite to the conveying direction towards the at least one crimped plastic filament, cools the filament, and thus solidifies its crimp.

According to the invention, the counter air flow is directed onto the at least one crimped plastic filament by means of a counter air flow slot tube oriented in line with the filament guide slot tube and coupled thereto. The at least one crimped plastic filament can be guided further in a bundle through the counter air flow slot tube, wherein the counter air flow can thus simultaneously be directed onto the at least one crimped plastic filament in a targeted manner. As a result of the slotted design of the counter air flow slot tube, cold air exits from it counter to the conveying direction. As a result, the temperature difference from the hot compressed air, with which the at least one crimped plastic filament is transported up to the counter air flow slot tube, and the intensity of the cold air at the transition from the filament guide slot tube to the counter air flow slot tube are still moderate compared to the other end of the counter air flow slot tube, so that the at least one crimped plastic filament can gradually cool and solidify in the counter air flow slot tube.

The texturing method according to the invention is substantially more economical than the known texturing methods described above, since the texturing nozzle assumes both the crimping and the cooling of the at least one crimped plastic filament in the texturing method according to the invention. The texturing nozzle formed according to the invention takes up substantially less installation space than just a combination of a texturing nozzle, suitable only for crimping, and a cooling drum and consumes significantly less energy.

Yet, the textured filaments produced using the texturing method according to the invention are equivalent in nature to conventionally-textured filaments.

According to the invention, the at least one crimped plastic filament is pulled through the counter air flow slot tube by an pass-through nozzle that is downstream of the counter air flow slot tube in the conveying direction and blows air in the conveying direction of the texturing nozzle. The pass-through nozzle causes an air flow directed in the conveying direction, which air flow conveys the at least one crimped plastic filament in the direction of an outlet tube or removal end of the texturing nozzle in spite of the counter air flow. In this way, a stagnation or accumulation of the at least one crimped plastic filament within the texturing nozzle can be avoided.

The method according to the invention can be carried out particularly effectively on a particularly compact device with reduced operating costs if the at least one plastic filament is preheated by a single heated godet pair before it is guided through the texturing nozzle.

In a simple but nevertheless highly effective embodiment of the method according to the invention, the counter air flow is at ambient pressure.

BRIEF DESCRIPTION OF THE FIGURES

A preferred embodiment of the present invention, its structure, function, and advantages are explained in more detail below with reference to figures, wherein FIG. 1 schematically shows an embodiment of a texturing nozzle of a texturing device according to the invention in a cutaway side view.

DETAILED DESCRIPTION OF THE INVENTION

Figure 1:
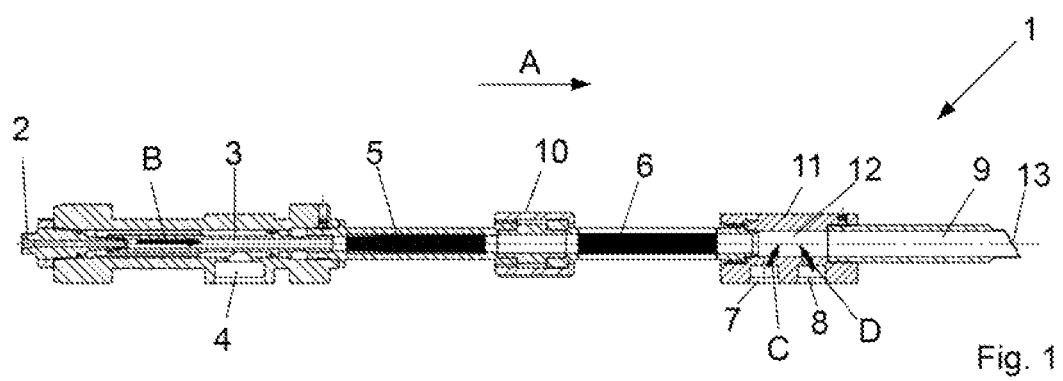
Figure 2:
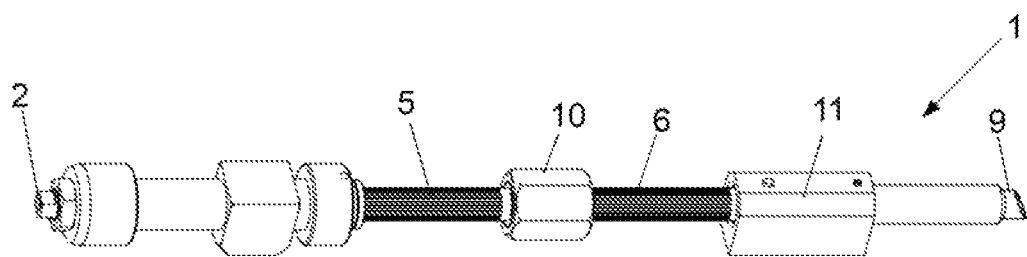
FIG. 2 schematically shows the texturing nozzle from FIG. 1 in a non-cutaway side view.

FIGS. 1 and 2 show a possible embodiment of a texturing nozzle 1 according to the invention.

In its conveying direction A, the texturing nozzle 1 comprises, one after the other, a nozzle needle 2, a nozzle insert 3 with a hot compressed air supply port 4 located thereon, a filament guide slot tube 5, a counter air flow slot tube 6, an pass-through nozzle 7, a cooling air supply port 8, and an outlet tube 9.

The nozzle insert 3 is an internally hollow region of the texturing nozzle 1, which is closed circumferentially except for the hot compressed air supply port 4. Correspondingly, at least one plastic filament, and preferably a filament bundle made of plastic filaments, can be heated or kept hot within the nozzle insert 3. The heating or keeping hot takes place by means of hot compressed air flowing into the nozzle insert 3 from the hot compressed air supply port 4. A hot compressed air flow B flowing in the conveying direction A of the texturing nozzle 1 is generated in the nozzle insert 3 by the hot compressed air supply port 4. The hot compressed air flow B has, for example, a pressure in a range of 5 to 6 bar and a temperature in a range of 100 to 150° C. or 120 to 130° C.

The filament guide slot tube 5 is mechanically coupled to the nozzle insert 3 in such a way that the at least one warm or hot plastic filament can enter directly from the nozzle insert 3 into the filament guide slot tube 5. The filament guide slot tube 5 is also hollow inside, but is slotted on its circumference so that air can exit from it.

The filament guide slot tube 5 is coupled to the counter air flow slot tube 6 by means of a coupling element 10 in such a way that their rotational axes lie on one line. The counter air flow slot tube 6 is also hollow inside and slotted on its circumference so that air can also exit from it.

An end of the counter air flow slot tube 6 located opposite the filament guide slot tube 5 is mechanically coupled to a connection block 11 of the texturing nozzle 1.

The connection block 11 comprises a filament guide channel 12 on the inside, to which, in the conveying direction of the texturing nozzle 1, first the pass-through nozzle 7 and then the cooling air supply port 8 are connected.

An air flow C entering from the pass-through nozzle 7 into the filament guide channel 12 is directed at least partially in the conveying direction A. A counter air flow D entering from the cooling air supply port 8 into the filament guide channel 12 is directed at least partially counter to the conveying direction A, and thus at least partially counter to the hot compressed air flow B.

Both the air that flows from the pass-through nozzle 7 into the filament guide channel 12 and the air that flows from the cooling air supply port 8 into the filament guide channel 12 is significantly colder than the hot compressed air flow B. The air from the cooling air supply port 8 or the counter air flow D generated thereby can be at ambient pressure, i.e., 1 bar.

The at least one plastic filament entering the texturing nozzle 1, and preferably a plurality of plastic monofilaments, such as 8 plastic monofilaments, which together form a filament bundle and are introduced into the texturing nozzle 1, is/are previously generated by a monofilament extrusion installation, optionally passed through a water bath, then pulled by at least one, and preferably one single, heated godet pair, thereby heated, and subjected to a certain stress, and then supplied directly, in a still hot, soft state, to the texturing nozzle 1 typically located under the heated godet pair.

The at least one plastic filament can consist, for example, of LDPE (low-density polyethylene) or of PP (polypropylene), wherein numerous other plastic materials are possible for this purpose.

The at least one plastic filament is blown through the texturing nozzle 1 at high air pressure, which is typically greater than 5 bar, and at high temperature, which is dependent upon the material, but usually greater than 100° C. The air with the high air pressure and the high temperature is generated by the hot compressed air supply port 4 connected to the nozzle insert 3.

The hot compressed air is discharged abruptly to the outside by the filament guide slot tube 5 arranged at the outlet of the nozzle insert 3. The discharge of hot compressed air takes place uniformly along the longitudinal slots of the filament guide slot tube 5. In the interior of the filament guide slot tube 5, the at least one plastic filament or the filament bundle is held together despite this. A flow break arises in the filament guide slot tube 5, in which the at least one plastic filament or the monofilaments of the filament bundle suddenly relax and crimp.

By means of the hot compressed air supply port 4, the at least one crimped plastic filament is pushed further by air that continues to flow, and it meets the ambient counter air of the counter air flow D directly. The at least one crimped plastic filament is braked and cooled in this counter air.

In the further course of the texturing method, a draw-off godet conveys the at least one crimped plastic filament further to a winder. The at least one crimped plastic filament cools further on the path between a nozzle outlet 13 of the texturing nozzle 1 and the draw-off godet.

The draw-off godet is typically unheated and draws off the crimped filaments with very low thread tension—for example, at a speed of about 100 m/min.

The textured thread is then wound onto a winding head by means of a winder.

Several texturing nozzles 1 can be arranged next to one another on a texturing device according to the invention, so that a plurality of filament bundles can be textured simultaneously.

In the texturing device according to the invention, temperature, air pressure, and thread or filament speed are precisely set and coordinated with one another, and there is thus no clogging within the texturing nozzle 1.

The invention claimed is:

1. A texturing device for producing crimped plastic filaments, the device comprising:
    a texturing nozzle having a nozzle insert with a hot compressed air supply port and a filament guide slot tube;
    a cooling mechanism being a counter air flow mechanism integrated in said texturing nozzle, said counter air flow mechanism having a cooling air supply port;
    a counter air flow slot tube oriented in line with said filament guide slot tube between said cooling air supply port and said filament guide slot tube; and
    a pass-through nozzle arranged between said counter air flow slot tube and said cooling air supply port.

2. The texturing device according to claim 1, which comprises one single heated godet pair arranged, in a filament processing direction of the texturing device, before said texturing nozzle.

3. A texturing method for producing crimped plastic filaments, the method comprises:
    blowing at least one plastic filament through a nozzle insert in a texturing nozzle in a conveying direction by a hot compressed air flow and crimping the at least one plastic filament in a filament guide slot tube adjoining the nozzle insert to form at least one crimped plastic filament;
    subsequently cooling the at least one crimped plastic filament by directing a counter air flow, which is at least partially directed counter to the hot compressed air flow and which is cooler than the hot compressed air flow, towards the at least one crimped plastic filament;
    directing the counter air flow onto the at least one crimped plastic filament by a counter air flow slot tube that is oriented in line with the filament guide slot tube and is coupled thereto, and pulling the at least one crimped plastic filament through the counter air flow slot tube by way of a pass-through nozzle that is downstream of the counter air flow slot tube in a conveying direction and that blows air in the conveying direction.

4. The texturing method according to claim 3, wherein the counter air flow is at ambient pressure.

* * * * *